July 13, 1937.     L. FREEDMAN     2,087,208
PISTON RING
Filed Jan. 17, 1934
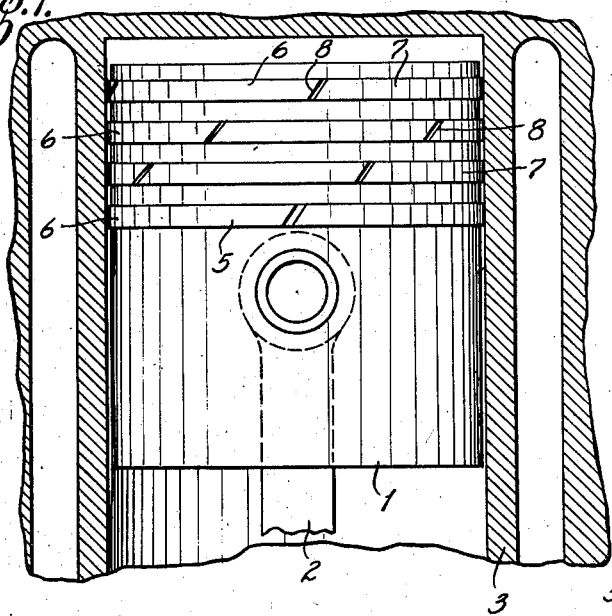
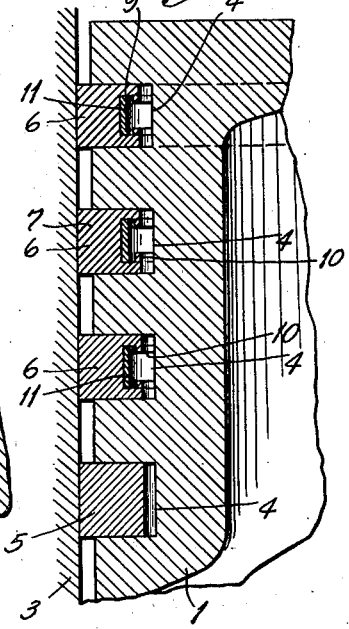
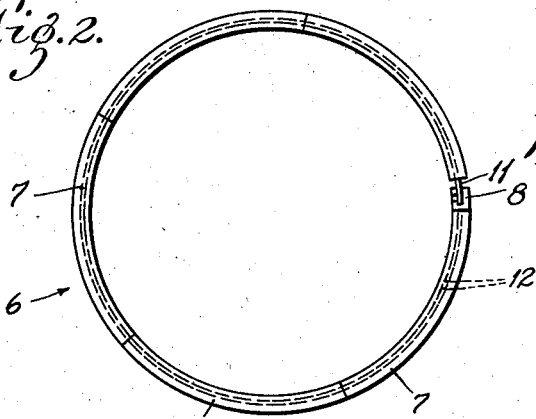
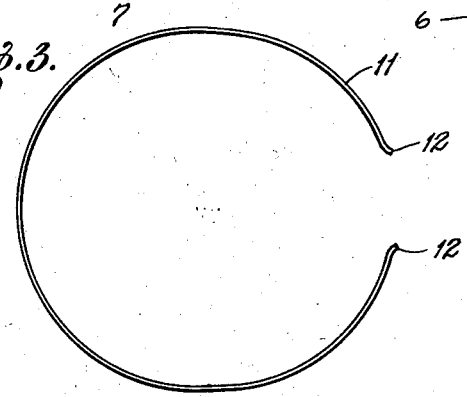
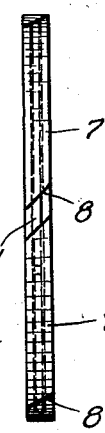
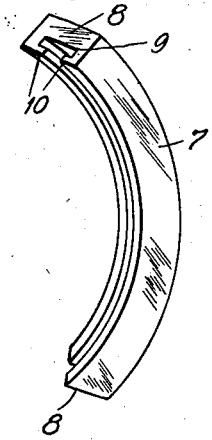
INVENTOR
LOUIS FREEDMAN.
By
his ATTORNEY.

Patented July 13, 1937

2,087,208

UNITED STATES PATENT OFFICE 2,087,208

PISTON RING

Louis Freedman, St. Louis, Mo.; William K. Frielingsdorf administrator of said Louis Freedman, deceased Application January 17, 1934, Serial No. 706,941

1 Claim. (Cl. 309—29)

This invention relates to piston constructions, and more particularly to a segmental piston ring construction and method of assembling the same.

Segmental piston rings that have been devised have been of extremely complicated construction, and considerable difficulty has been encountered in keeping the various parts of such rings together when assembling them on pistons; and the principal object of the present invention is to provide a segmental piston ring whose parts are readily assembled together and mounted on a piston. Other objects are to provide an extremely flexible segmental piston ring that is readily adjustable in tension; that is expandible equally around the ring; that is readily replaceable; that is of simple construction; and that is comparatively inexpensive to make.

The invention consists principally in a composite piston ring made up of a plurality of arcuately shaped ring segments that are provided with circumferential seats for receiving a split spring ring of such shape and material that the ring segments can be strung thereon in a manner simulating bead stringing. The invention also consists in the piston and ring construction, and in the parts, combinations and arrangements of parts hereinafter described and claimed.

In the accompanying drawing which forms part of this specification and wherein like reference numerals refer to like parts wherever they occur;

Fig. 1 is a side elevation of a piston equipped with segmental piston rings embodying my invention;

Fig. 2 is a plan view of one of the segmental piston rings;

Fig. 3 is a plan view of a split expanding spring ring upon which the ring segments of the segmental piston ring are assembled;

Fig. 4 is an enlarged, fragmentary, sectional view of the upper left hand portion of Fig. 1;

Fig. 5 is a side elevation of the piston ring shown in Fig. 2; and

Fig. 6 is a perspective view of one of the ring segments of the segmental piston ring.

In the construction illustrated, a piston member 1, provided with the usual connecting rod 2, is mounted for reciprocating movement in a cylinder 3. The upper end portion of the piston member 1 has a series of spaced, rectangular shaped grooves 4 in its outer periphery. Disposed within the lowermost groove 4, which is located near the middle of the piston member, is an ordinary obliquely cut one-piece piston or oil ring 5. Disposed within each of the grooves above the oil ring groove, and three such grooves are shown in the drawing, is a segmental piston ring 6 conforming to my invention. The particular mounting arrangement of the segmental piston rings and the comparatively stiff oil ring is an important feature of the piston construction for reasons hereinafter set forth.

Each segmental piston ring comprises a plurality of arcuately shaped ring segments 7, which segments are shown as having obliquely cut ends 8, although it may be feasible to provide the ring segments with mating ends of any suitable shape. Each arcuately shaped ring segment 7 is of integral construction and is provided with a groove 9 in the middle of its inner periphery, the width of such groove being reduced near the inner periphery of the ring segment to form shoulders 10 on each side of the groove and a circumferential seat or opening throughout the ring segment from end to end thereof between such shoulders and the bottom of the groove.

When the ring segments are assembled together to form a single ring, the circumferential seats or openings extending through the ring segments form a single circumferential seat or opening around the ring; and such seat is adapted and arranged to receive a split ring 11 of spring material. This spring ring is made of such size with respect to the seats in the ring segments that they can be moved circumferentially around the spring ring, and the spring ring is made of sufficiently resilient spring material that the ring segments can be assembled together to form a single ring by stringing them on the split ring in a manner simulating bead stringing.

In assembling the parts of the segmental ring together one end of the split spring ring (which is originally shaped with its ends spread apart as shown in Figure 3) is inserted into the end of the opening in one of the ring segments, and such segment is then forced around the spring ring to make room for another ring segment; and the remaining ring segments are similarly assembled on the spring ring. When all of the ring segments are assembled on the spring ring, one end portion thereof is made to project beyond the end of the last ring segment assembled on the spring ring, and this projecting end portion of the spring ring is snapped into the end of the opening in the adjacent ring segment to form a single ring. In this connection, the end portions of the split spring ring may be bent outwardly as indicated at 12 so that these outwardly bent end portions of the split spring ring will press against the bottom of the groove in the ring segment in which they meet and prevent the ends of the spring ring from spreading apart and slipping out of such groove.

When the parts of the ring are assembled together in this manner they are all held together in the form of a single ring for display purposes, or the like. When it is desired to assemble the composite ring on a piston all that it is necessary to do is to pull one end of the spring ring out of the groove in the ring segment in which it is seated and open up the ring so that it can be slipped over the end of the piston member and into the piston ring groove in which it is to be seated; and when the ring is seated in such groove, the end portion of the spring ring can then be readily snapped back into the opening in the adjacent ring segment, and the parts of the ring will be securely held together in the piston ring groove in the form of a single ring.

The advantages of my invention are obvious. Segmental piston rings embodying my invention are of extremely simple construction; and the parts of the rings are readily assembled together as herein above described. Moreover, the segmental rings are extremely flexible as each segment thereof is free to adjust itself and move independently of the other segments so that the composite ring will conform in shape to that of the wall of the cylinder in which it is reciprocating to insure a perfect seal and reduce wear between the parts.

Segmental piston rings embodying my invention are readily adjustable in tension by varying the length of the split spring ring; and in case a segmental ring conforming to my invention should become worn to such extent that its sealing effectiveness is impaired, it is not necessary to discard the entire ring; but a single ring segment can be replaced by a slightly longer segment and thus bring the diameter of the composite ring back to its original length.

The particular mounting arrangement of the comparatively flexible segmental piston rings and the comparatively stiff oil ring tends to prevent uneven wear of the cylinder wall throughout its length. By referring to Fig. 1, it is to be noted that the oil ring near the lower end of the stroke of the piston traverses a portion of the cylinder wall that is not reached by the group of segmental rings. As the oil ring is made comparatively stiff it will tend to wear down the cylinder wall much more than any of the segmental rings. Accordingly, the portion of the cylinder wall traversed only by the oil ring will be gradually worn down to approximately the same extent that the portion of the cylinder wall traversed by all the rings is worn down since the wearing down of the cylinder wall by the segmental rings will be practically negligible.

I claim:

A composite piston ring comprising a plurality of ring segments, each ring segment having a circumferential seat extending therethrough, and a split spring ring extending through the seats in the ring segments holding them together in the form of a single ring, one end of the split spring ring being bent for cramping the same in the seat in the ring segment in which it is seated for preventing it from slipping out of such seat.

LOUIS FREEDMAN.